(12) United States Patent
Nagahara et al.

(10) Patent No.: US 11,829,819 B2
(45) Date of Patent: Nov. 28, 2023

(54) PRINTING APPARATUS AND METHOD OBTAINING APPROPRIATE CODE SIZE FOR MEDIUM TYPE BASED ON RESULTS OF TRIAL PRINTING GROUP OF DIFFERENT SIZED CODES

(71) Applicant: SEIKO EPSON CORPORATION, Tokyo (JP)

(72) Inventors: Atsushi Nagahara, Matsumoto (JP); Shinichi Arazaki, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/052,994

(22) Filed: Nov. 7, 2022

(65) Prior Publication Data
US 2023/0143811 A1    May 11, 2023

(30) Foreign Application Priority Data
Nov. 8, 2021   (JP) .................................. 2021-181792

(51) Int. Cl.
*G06K 15/02*   (2006.01)
*G06K 19/08*   (2006.01)
(Continued)

(52) U.S. Cl.
CPC ......... *G06K 15/027* (2013.01); *G06K 15/021* (2013.01); *G06K 15/102* (2013.01);
(Continued)

(58) Field of Classification Search
CPC .. G06K 15/021; G06K 15/027; G06K 15/102; G06K 15/1825; G06K 15/1843; G06K 19/06037; G06K 19/06046; G06K 19/06131; G06K 19/06178; G06K 19/08; G06K 2019/06215; G06K 2019/06234; G06K 2019/06253; H04N 1/00326;
(Continued)

(56) References Cited

U.S. PATENT DOCUMENTS 6,364,209 B1 *   4/2002   Tatsuta ................. G06K 7/1443
                                                       235/494
7,229,025 B2 *   6/2007   Sussmeier ........ G06K 19/06037
                                                       235/494
(Continued)

FOREIGN PATENT DOCUMENTS

JP    2005-47169 A    2/2005

*Primary Examiner* — Scott A Rogers
(74) *Attorney, Agent, or Firm* — WORKMAN NYDEGGER

(57) ABSTRACT

A printing apparatus includes a transport unit, a printing unit, a reading unit, and a control unit configured to control the transport unit and the printing unit to perform first printing processing and second printing processing, wherein the control unit prints, in the first printing processing, a code group including a first code of a first size and a second code of a second size larger than the first size on a first medium that is the medium, acquires reading data that is a result of reading, by the reading unit, of the code group printed on the first medium, determines a code size to be adopted for the second printing processing based on the reading data, and, in the second printing processing, prints a third code of the code size on a medium of the same type as that of the first medium.

12 Claims, 9 Drawing Sheets

(51) Int. Cl.
  *G06K 19/06* (2006.01)
  *G06K 15/10* (2006.01)
(52) U.S. Cl.
  CPC ..... *G06K 15/1825* (2013.01); *G06K 15/1843* (2013.01); *G06K 19/06037* (2013.01); *G06K 19/08* (2013.01)
(58) Field of Classification Search
  CPC .......... H04N 1/00328; H04N 1/00334; H04N 1/00363; H04N 1/32101; H04N 1/32133; H04N 1/393; H04N 1/3935; H04N 1/40068; H04N 1/00002–00092
  See application file for complete search history.

(56) References Cited

U.S. PATENT DOCUMENTS

| | | | |
|---|---|---|---|
| 7,543,748 B2* | 6/2009 | Kiliccote | G06K 19/06037 235/487 |
| 8,009,315 B2* | 8/2011 | Okamoto | G06V 30/1448 358/1.16 |
| 9,111,186 B2* | 8/2015 | Blasinski | G06K 19/0614 |
| 2014/0203085 A1* | 7/2014 | Park | G06F 16/9554 235/494 |
| 2023/0053483 A1* | 2/2023 | Ohashi | G06K 15/102 |

* cited by examiner

| ITEM | VALUE |
|---|---|
| CODE REGION SIZE | VERTICAL 10 cm BY HORIZONTAL 10 cm |
| READING REGION SIZE | VERTICAL 20 cm BY HORIZONTAL 50 cm |
| CODE SIZE | 1cm, 2cm, 3cm, 4cm, 5cm |
| THE NUMBER OF REPETITIONS | 4 |
| TEST CHARACTER STRING | ABCDEFGHIJK |

FIG. 4

| 50 ROW NUMBER | CODE SIZE | | | | |
|---|---|---|---|---|---|
| | 1cm | 2cm | 3cm | 4cm | 5cm |
| 1 | × | ○ | ○ | ○ | ○ |
| 2 | × | × | × | ○ | ○ |
| 3 | × | × | ○ | ○ | ○ |
| 4 | × | ○ | ○ | ○ | ○ |

FIG. 6

PRINTING APPARATUS AND METHOD OBTAINING APPROPRIATE CODE SIZE FOR MEDIUM TYPE BASED ON RESULTS OF TRIAL PRINTING GROUP OF DIFFERENT SIZED CODES

The present application is based on, and claims priority from JP Application Serial Number 2021-181792, filed Nov. 8, 2021, the disclosure of which is hereby incorporated by reference herein in its entirety.

BACKGROUND

1. Technical Field

The present disclosure relates to a printing apparatus and a printing method.

2. Related Art

An ink jet recording device has been disclosed that includes an image forming device that forms an image including a bar code on a target recording medium using a recording head capable of discharging ink, a transport device that relatively moves the image forming device and the target recording medium, a target recording medium selection device that selects a type of the target recording medium, and a control device that changes a configuration of the bar code in accordance with the selected type of the target recording medium (see JP 2005-47169 A). According to JP 2005-47169 A, a bar code correction table is referenced based on the type of target recording medium, and bar code printing is performed with correction for a dot configuration of bars and spaces corresponding to the target recording medium.

JP 2005-47169 A is intended to automatically change a method of the bar code printing depending on a media used, and provide a bar code printing method with stable quality even when a bar code is printed using a plurality of types of media. However, for a medium for which corresponding correction information is not stored in the table in advance, a quality reduction in the bar code printing cannot be suppressed. Correction for the case where such a medium is used requires a user to obtain an appropriate value through trial and error, which has a large burden on the user. Therefore, there is a demand for improvements to maintain quality of a code such as a bar code or a two-dimensional code while mitigating the burden on the user.

SUMMARY

A printing apparatus includes a transport unit configured to transport a medium along a predetermined transport direction, a printing unit configured to perform printing on the medium transported by the transport unit, a reading unit configured to read the medium on which printing is performed by the printing unit, and a control unit configured to control the transport unit and the printing unit to perform first printing processing and second printing processing, wherein the control unit prints, in the first printing processing, a code group including a first code of a first size and a second code of a second size larger than the first size on a first medium that is the medium, acquires reading data that is a result of reading, by the reading unit, of the code group printed on the first medium, determines a code size to be adopted for the second printing processing based on the reading data, and, in the second printing processing, prints a third code of the code size on a medium of the same type as that of the first medium.

A printing method performed by a printing apparatus including a transport unit that transports a medium along a predetermined transport direction, and a printing unit that performs printing on the medium transported by the transport unit, includes a first printing step and a second printing step for controlling the transport unit and the printing unit, wherein in the first printing step, a code group including a first code of a first size and a second code of a second size larger than the first size is printed on a first medium that is the medium, an acquisition step for acquiring reading data that is a result of reading, by the reading unit, of the code group printed on the first medium, and a determination step for determining a code size to be adopted for the second printing step based on the reading data are further included, and in the second printing step, a third code of the code size is printed on a medium of the same type as that of the first medium.

BRIEF DESCRIPTION OF THE DRAWINGS

FIG. 4 is a diagram illustrating an example of test code generation condition information.

FIG. 6 is a diagram illustrating an example of an errata as an analysis result in step S140.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

1. Overview of Device Configuration

Figure 1:
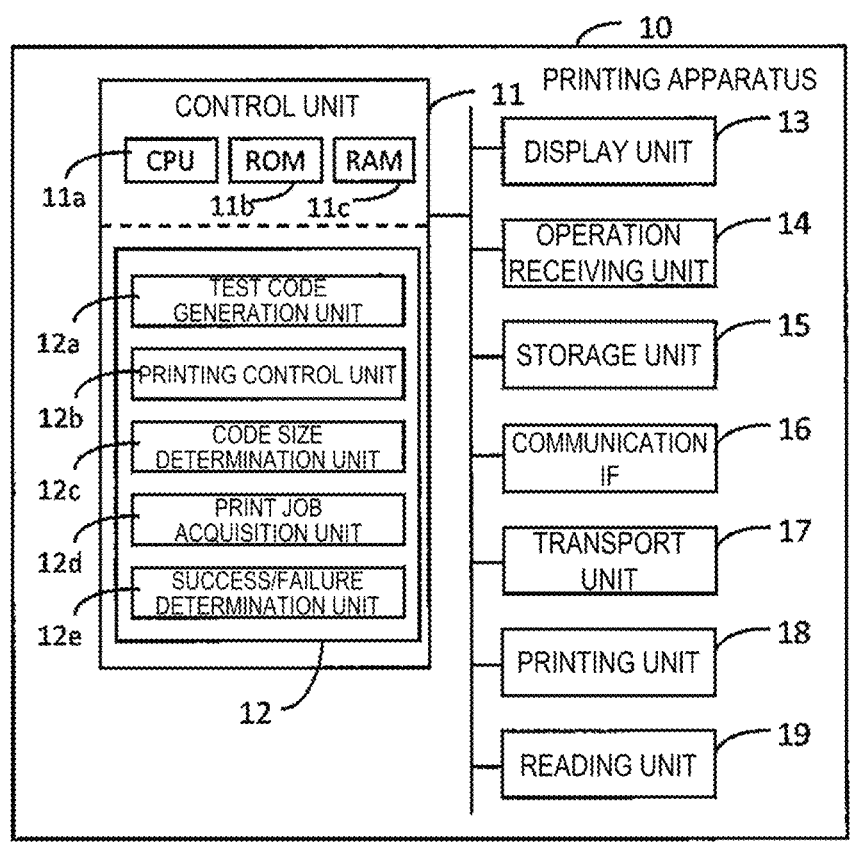
FIG. 1 is a block diagram illustrating a device configuration of the present exemplary embodiment in a simplified manner.

FIG. 1 illustrates a configuration of a printing apparatus 10 according to the present exemplary embodiment, in a simplified manner. A printing method of the present exemplary embodiment is performed by the printing apparatus 10.

The printing apparatus 10 is provided with a control unit 11, a display unit 13, an operation receiving unit 14, a storage unit 15, a communication IF 16, a transport unit 17, a printing unit 18, a reading unit 19, and the like. IF is an abbreviation for interface. The control unit 11 is configured to include, as a processor, one or more ICs including a CPU 11*a*, a ROM 11*b*, a RAM 11*c*, and the like, another nonvolatile memory, and the like.

In the control unit 11, the processor, that is, the CPU 11*a* executes arithmetic processing in accordance with a program 12 stored in the ROM 11*b*, other memory, or the like, using the RAM 11*c* or the like as a work area, to realize various functions such as a test code generation unit 12*a*, a printing control unit 12*b*, code size determination unit 12*c*, a print job acquisition unit 12*d*, and a success/failure determination unit 12*e*. The processor is not limited to a single CPU, and a configuration may be adopted in which the processing is performed by a plurality of CPUs or a hardware circuit such as an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display, and a drive circuit for driving the display. The operation receiving unit 14 is a device for receiving input by a user, and is realized, for example, by a physical button, a touch panel, a mouse, a keyboard, or the like. Of course, the touch panel may be realized as a function of the display unit 13. The display unit 13 and the operation receiving unit 14 may be collectively referred to as an operation panel of the printing apparatus 10. The display unit 13 and the operation receiving unit 14 may be a part of the configuration of the printing apparatus 10, but may be peripheral devices externally coupled to the printing apparatus 10.

The storage unit 15 is, for example, a storage device by a hard disk drive, a solid state drive, other memory, or the like. A part of the memory included in the control unit 11 may be understood as the storage unit 15. The storage unit 15 may be understood as a part of the control unit 11.

The communication IF 16 is a generic term for one or a plurality of IFs for the printing apparatus 10 to communicate with an external device in a wired or wireless manner, in accordance with a prescribed communication protocol including known communication standards. The external device is, for example, a communication device such as a personal computer, a server, a smart phone, or a tablet type terminal.

The transport unit 17 is a device for transporting a medium 30 along a predetermined transport direction under control of the control unit 11. The transport unit 17 includes, for example, a roller that rotates to transport the medium 30, a motor as a power source for the rotation, and the like. Furthermore, the transport unit 17 may be a mechanism in which the medium 30 is loaded on a belt or a pallet moved by a motor to transport the medium 30. The medium 30 may be, for example, paper, but only needs to be a medium that can be a target of printing, or may be a material other than paper, such as a film or fabric.

The printing unit 18 is a device, under control of the control unit 11, for discharging liquid such as ink from a plurality of nozzles by an ink jet method, and printing on the medium 30 transported by the transport unit 17, and includes a printing head 20 described below. A droplet that is discharged from the nozzle of the printing head 20 is referred to as a dot. The printing head 20 is capable of discharging a plurality of types of ink, such as cyan (C), magenta (M), yellow (Y), and black (K), for example. The printing head 20 may be referred to as a liquid discharging head, a recording head, a printing head, an ink jet head, or the like.

The reading unit 19 is a device for optically reading the medium 30 on which printing is performed by the printing unit 18. The reading unit 19 may be referred to as a camera, or may be referred to as a scanner. The reading unit 19 has an image sensor capable of reading a certain area of the medium 30, and transfers image data (hereinafter, reading data) as a result of reading by the image sensor to the control unit 11. In the example in FIG. 1, the reading unit 19 is included in the configuration of the printing apparatus 10, but the reading unit 19 may be an external device communicably coupled to the printing apparatus 10.

The printing apparatus 10 may be configured to be realized by a single printer, but may be realized by a system including a plurality of communicatively coupled devices. For example, the printing apparatus 10 may be a system including an information processing device responsible for a role of the control unit 11, a printer that includes the transport unit 17 and the printing unit 18, and performs printing under control of the information processing device, and a device corresponding to the reading unit 19. In this case, the information processing device can be understood as a printing control device, an image processing device, or the like.

Figure 2:
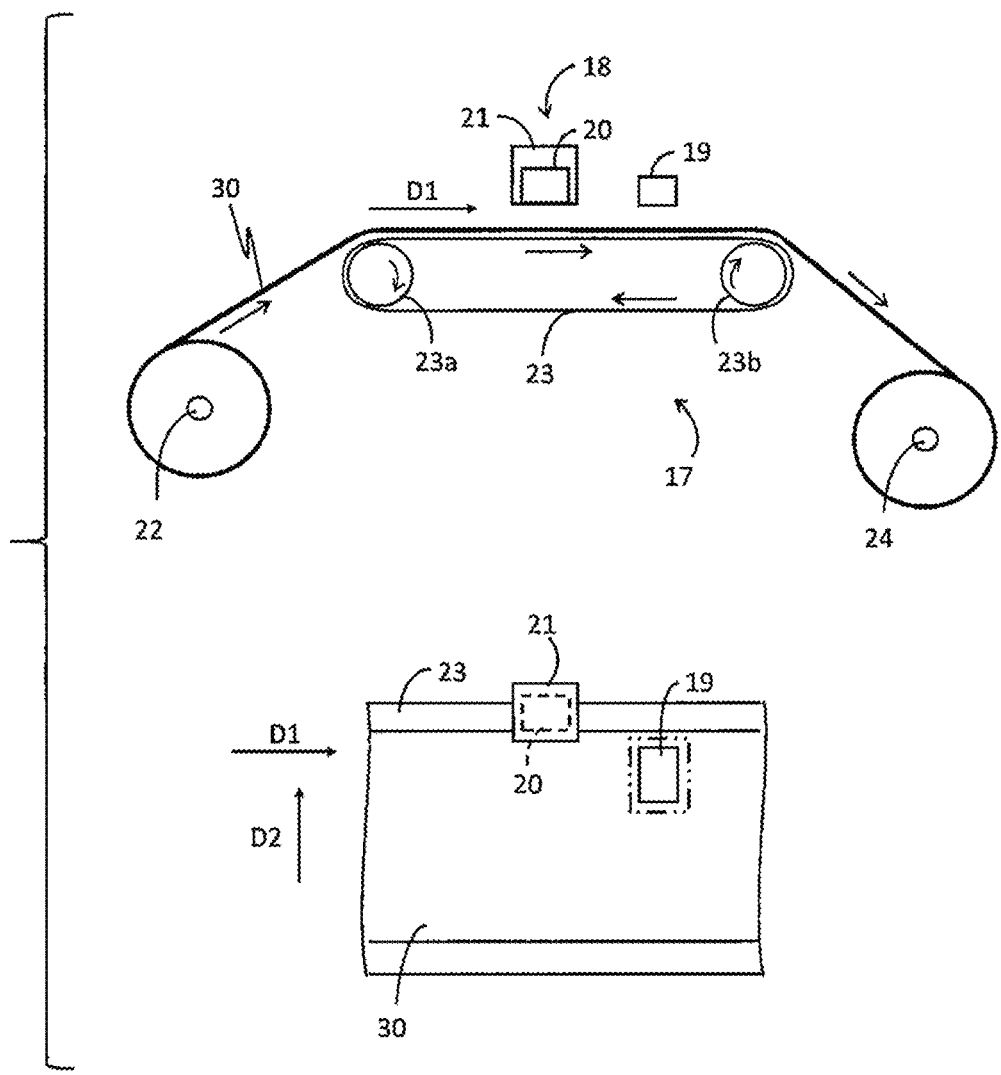
FIG. 2 is a diagram illustrating a relationship among a medium, a printing head, and the like, from a viewpoint in a direction orthogonal to a transport direction and from a viewpoint from above in a simplified manner.

FIG. 2 illustrates a relationship among the medium 30, the printing head 20, and the like, from a viewpoint in a direction orthogonal to a transport direction D1 and from a viewpoint from above in a simplified manner. According to the example in FIG. 2, the printing apparatus 10 includes a feeding machine 22, an endless belt 23, and a winding machine 24. The feeding machine 22, the endless belt 23, and the winding machine 24 constitute at least a part of the transport unit 17. The sheet-shaped medium 30 is wound in a roll shape around the feeding machine 22, and the medium 30 is fed from the roll-shaped medium 30 toward the winding machine 24. The winding machine 24 winds the medium 30 after printing, in a roll shape. The feeding machine 22 and the winding machine 24 are each able to rotate by a motor, and perform feeding and winding of the medium 30.

The endless belt 23 is disposed in a transport path between the feeding machine 22 and the winding machine 24. The endless belt 23 is bridged outside the two rollers 23*a* and 23*b*, and moves in accordance with rotation of the rollers 23*a* and 23*b*. In the transport path between the feeding machine 22 and the winding machine 24, the medium 30 is transported in a state of being supported by the endless belt 23. Although the details are omitted, the feeding machine 22, the rollers 23*a*, 23*b*, and the winding machine 24 synchronously rotate to transport the medium 30.

The transport direction D1 is a direction of transport by the transport unit 17 in a section, of the transport path of the medium 30, that is supported by the endless belt 23. Upstream and downstream in the transport direction D1 are simply referred to as upstream and downstream, respectively. A direction D2 intersecting the transport direction D1 is referred to as a width direction D2. The intersection here means orthogonal or nearly orthogonal.

A carriage 21 and the printing head 20 are supported above the endless belt 23. The printing head 20 is mounted at the carriage 21. In the example in FIG. 2, the carriage 21 can reciprocate in parallel with the width direction D2 by receiving power of a carriage motor (not illustrated), and the printing head 20 moves together with the carriage 21. That is, in the example in FIG. 2, the printing unit 18 includes the carriage 21 and the printing head 20.

The reading unit 19 is supported above the endless belt 23, and at a predetermined position downstream the printing head 20. In FIG. 2, a range surrounded by a two-dot chain line around the reading unit 19 illustrates an area that is readable by the image sensor of the reading unit 19 by imaging performed once. In the example in FIG. 2, the reading unit 19 does not move.

In such an example in FIG. 2, the control unit 11 moves the carriage 21 in parallel with the width direction D2 while causing the transport unit 17 to stop the transport of the medium 30, and causes the printing head 20 to discharge ink during this movement, to perform printing corresponding to scanning performed once on the medium 30. The control unit 11 alternately repeats the printing corresponding to scanning performed once, and the transport of the medium 30 by a predetermined distance, to advance the printing on the medium 30.

Of course, such a printing method is merely an example. For example, the carriage 21 may not only be capable of reciprocating in parallel with the width direction D2, but also reciprocating in parallel with the transport direction D1. That is, by the printing head 20 moving two-dimensionally in parallel with a surface of the medium 30 by the carriage 21, printing may be performed on an area of a predetermined size in the still medium 30, and the control unit 11 may repeat such printing and transport of the medium 30.

Alternatively, there may be no carriage 21 mounted with the printing head 20, and the printing head 20 may be a line type head having a length capable of covering a length of the medium 30 in the width direction D2 (hereinafter, a medium width). That is, the printing head 20 of line type may be fixed above the endless belt 23, and the control unit 11 may perform printing by causing the printing head 20 to discharge ink onto the medium 30 being moved by the endless belt 23.

Of course, aside from the configuration illustrated in FIG. 2, the transport unit 17 appropriately has a configuration required for transporting the medium 30, such as a roller for adjusting tension of the medium 30, for example. Additionally, a configuration may be adopted in which a platform having no transport capability is installed in place of the endless belt 23, and the medium 30 is moved from upstream to downstream on the platform by transport capability of other rollers or the like.

2. Code Size Determination Processing

Figure 3:
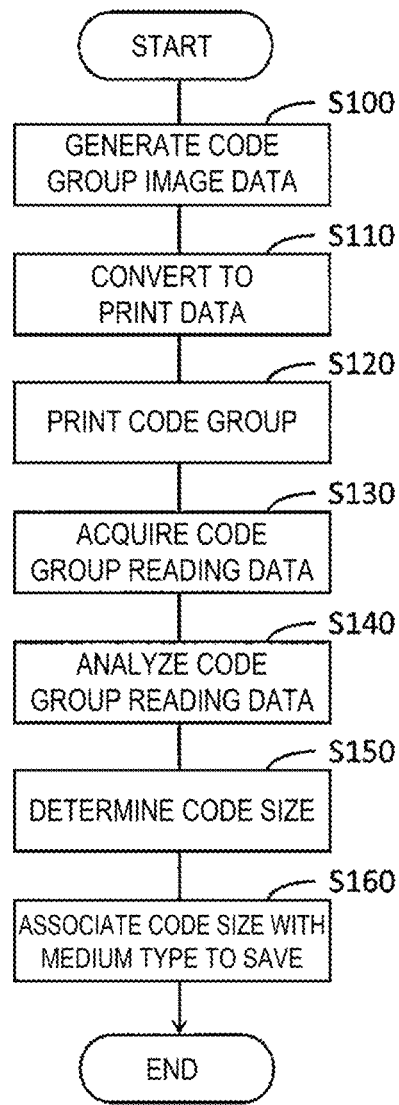
FIG. 3 is a flowchart illustrating code size determination processing.

FIG. 3 illustrates, using a flowchart, "code size determination processing" performed by the control unit 11 in accordance with the program 12. In the present exemplary embodiment, a "code" is an image obtained by coding and recording any information such as a character string, and specifically, is a bar code or a two-dimensional code. Hereinafter, assuming that a code is a two-dimensional code, the description will be continued.

The control unit 11 repeatedly performs the code size determination processing, for example, at a predetermined interval. Specifically, the control unit 11 performs the code size determination processing at preset dates and times at constant intervals. Furthermore, the control unit 11 may perform the code size determination processing when a predetermined time elapses after the previous code size determination processing is completed.

The control unit 11 may perform the code size determination processing at timing when the medium 30 is set to the transport unit 17. In the example in FIG. 2, when recognizing that the medium 30 is loaded on the feeding machine 22 by a sensor or input from a user, the control unit 11 may perform the code size determination processing.

In the present exemplary embodiment, the control unit 11 is assumed to recognize a type of the medium 30 set in the transport unit 17. Examples of the type of medium 30 include, for example, paper, fabric, a film, and the like. Of course, each of paper, fabric, a film, and the like may be further classified into various different types. The medium 30 set in the transport unit 17 is also referred to as a "use medium" in a sense that the medium 30 is a medium used for printing. For example, a user inputs a type of a use medium via the operation receiving unit 14, and the control unit 11 recognizes the input type as the type of the use medium. Alternatively, the printing apparatus 10 may include a sensor for detecting a type of a use medium, and the control unit 11 may recognize the type of the use medium in accordance with a detection result from the sensor. In the code size determination processing, the control unit 11 determines an optimal size of a code to be printed on a use medium.

The control unit 11 controls the transport unit 17 and the printing unit 18 to perform "first printing processing" and "second printing processing". The first printing processing is included in the flowchart of the code size determination processing, and specifically, steps S100, S110, and S120 correspond to the first printing processing. The second printing processing will be described later with reference to FIGS. 8 and 9. For example, the first printing processing may be referred to as pre-printing processing or code group printing processing. The second printing processing may be referred to as production printing processing. Further, the first printing processing corresponds to a first printing step, and the second printing processing corresponds to a second printing step.

In step S100, the test code generation unit 12a of the control unit 11 generates "code group image data" representing a "code group" including a plurality of codes having different sizes. Each code constituting the code group may be referred to as a test code. In generation of the code group image data, the test code generation unit 12a refers to test code generation condition information 40 as illustrated in FIG. 4. The test code generation condition information 40 is stored in the storage unit 15.

The test code generation condition information 40 includes items such as a code region size, a reading region size, a code size, the number of repetitions, and a test character string.

The code region size is a size of a region ensured for printing one code, a value thereof is, for example, vertical 10 cm by horizontal 10 cm. Here, "vertical" refers to the transport direction D1, "horizontal" is the width direction D2. The code region size is set to be a size larger than a maximum code size so that codes are not too close to each other.

The reading region size is an area that can be read by the image sensor of the reading unit 19 performing imaging once, and is illustrated by a two-dot chain line in FIG. 2 as described above. The reading region size is a value determined based on performance of the reading unit 19, and is, for example, vertical 20 cm by horizontal 50 cm.

The code size defined by the test code generation condition information 40 is a size of each code included in the code group. In the example in FIG. 4, the code is simplified to be square, and five types of code sizes different from each other with different side lengths such as 1 cm, 2 cm, 3 cm, 4 cm, and 5 cm are defined. Such a plurality of code sizes are specific examples of a "first size" and a "second size" that is larger than the first size, in the present exemplary embodiment.

The first size and the second size do not each mean a unique size, but mean two types of sizes different from each other. For example, when 1 cm is taken as a first size, each size of 2 cm, 3 cm, 4 cm, and 5 cm corresponds to the second size. In addition, if 4 cm is taken as the second size, each size of 1 cm, 2 cm, and 3 cm corresponds to the first size. A code of the first size may be referred to as a "first code" and a code of the second size may be referred to as a "second code".

The number of repetitions is the number of codes of the same size included in a code group, and is "4" according to the example in FIG. 4. In other words, codes of five types of sizes such at 1 cm, 2 cm, 3 cm, 4 cm, and 5 cm are each printed four times. If the number of repetitions is set to 1, then the codes of five types of sizes are each printed once.

The test character string is a character string to be recorded in each code to be included in a code group. That is, each code to be included in a code group may have the same contents. The test character string may have any kind of contents as long as the contents are predetermined. In FIG. 4, a character string "ABCDEFGHIJK" is simply used as the test character string. Such test code generation condition information 40 is stored in advance in the storage unit 15, but a user may freely set a value of each of the code region size, the code size, the number of repetitions, and the test character string, by operating the operation receiving unit 14.

The test code generation unit 12a generates code group image data with reference to the test code generation condition information 40. According to the example in FIG. 4, in a single reading region size, a total of ten code region sizes, that is, vertical (transport direction D1) two by horizontal (width direction D2) five, can be arranged, and the number of codes to be printed is 20. Thus, the test code generation unit 12a generates code group image data by arranging a total of 20 codes, that is, codes of five different sizes by four, in each of which the test character string "ABCDEFGHIJK" is recorded, in a total of 20 code region sizes, that is, vertical four by horizontal five, in a size in which two reading region sizes are vertically arranged. The code group image data is, for example, bitmap data including brightness and a gray scale value of color for each pixel. In this manner, the test code generation unit 12a determines the number of codes constituting the code group in each of the transport direction D1 and the width direction D2 in accordance with the area (reading region size) that is readable by the reading unit 19, and generates the code group image data in which the plurality of codes are arranged in accordance with the determination.

Figure 5A:
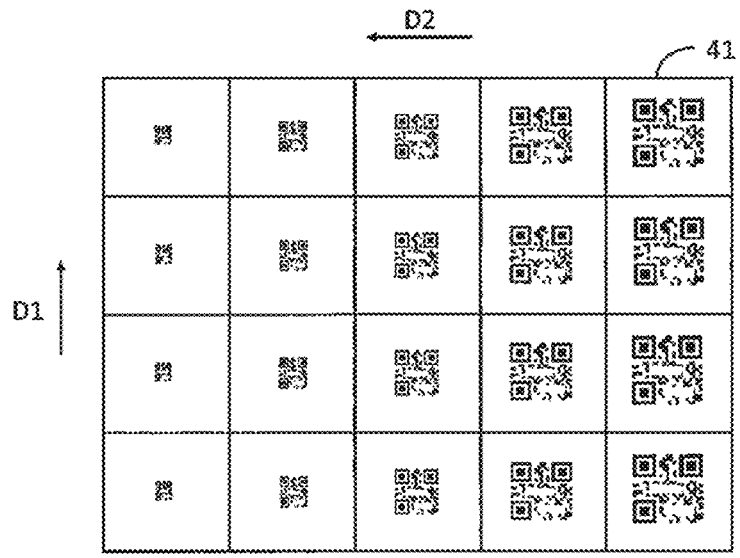
FIG. 5A and FIG. 5B are diagrams each illustrating an example of code group image data.

FIG. 5A illustrates code group image data 41 generated with reference to the test code generation condition information 40 in step S100. In FIG. 5A and the like, an orientation of data is illustrated with a relationship between directions D1 and D2. 20 rectangles partitioned by solid lines in the code group image data 41 each correspond to the code region size. The lines for such partitioning may be present or absent. When the five code region sizes horizontally arranged in the code group image data 41 are collectively referred to as a "code row", two code rows correspond to a single reading region size. In the example in FIG. 5A, in the code group image data 41, the codes of five different types are arranged in one code row in an order of size, and four codes of the same size are arranged vertically in one column.

Figure 5B:
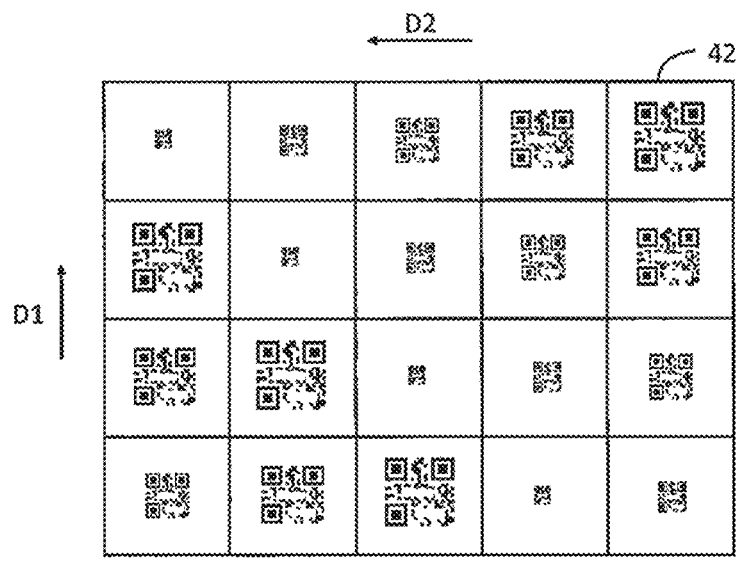

FIG. 5B illustrates an example of code group image data 42 generated with reference to the test code generation condition information 40 in step S100, which is different from the code group image data 41 in FIG. 5A. For the code group image data 42, difference from the code group image data 41 will be described. The code group image data 41 and 42 are the same in that the codes of five different sizes are included in one code row, but in the code group image data 42, positions in the width direction D2 of the codes of respective sizes are different for each code row. That is, positions in the width direction D2 of the respective four codes of the same size are different from each other. Printing quality by the printing head 20 may vary depending on positions in the width direction D2. Therefore, as in FIG. 5B, by making the positions in the width direction D2 of the respective codes of the same size different, it is possible to suppress a variation in average print quality due to influence of the positions, among the codes of different sizes.

In step S110, the printing control unit 12b converts the code group image data generated in step S100 into print data for use in printing by the printing head 20. In other words, the printing control unit 12b color-converts a gray scale value for each pixel constituting the code group image data into a gray scale value representing an ink amount for each of CMYK inks used for printing by the printing head 20, or converts a value for each pixel after the color conversion to a value representing dot formation or non-dot formation of each color ink by halftone processing.

In step S120, the printing control unit 12b controls the transport unit 17 and the printing unit 18 based on the print data converted from the code group image data in step S110, and causes a code group to be printed on the medium 30 by ink discharge from the printing head 20. According to the example in FIG. 2, a position of the reading unit 19 is pre-determined in accordance with product standards. Therefore, the control unit 11 recognizes in advance the position of the reading unit 19 and a position of the reading region size in the width direction D2. Thus, in step S120, the printing control unit 12b adjusts a position of the print data in the width direction D2 so that the code group is printed at a position that is read by the reading unit 19, and causes the printing head 20 to print the code group based on the print data.

The medium 30 on which the code group is printed in step S120 is, of course, a use medium recognized by the control unit 11. In addition, in the present exemplary embodiment, the medium 30 used to print the code group in the first printing processing is also referred to as a "first medium" for convenience. The first medium does not mean a specific type of medium, but refers to a use medium when a code group is printed. According to such first printing processing, a code group including a first code and a second code is printed on a first medium. Further, according to the examples in FIGS. 4, 5A, and 5B, the code group including the plurality the plurality of sizes of codes including the first code and the second code is printed on the first medium.

In step S130, the code size determination unit 12c acquires reading data (hereinafter, code group reading data), which is a result of reading, by the reading unit 19, of the code group printed on the medium 30 in step S120. Step S130 corresponds to an acquisition step.

In this case, the control unit 11 controls the transport unit 17 to transport the medium 30 downstream so that the code group printed on the medium 30 by the printing head 20 reaches the position of the reading region size of the reading unit 19. According to the examples thus far, the code group has an area twice the reading region size in the transport direction D1. Thus, the control unit 11 first causes the reading unit 19 to perform imaging of an area corresponding to two code rows on a downstream side in the code group, and then to perform imaging of an area corresponding to two code rows on an upstream side in the code group.

Of course, the control unit 11, after causing imaging corresponding to the two code rows on the downstream side to be performed, then causing the transport unit 17 to transport the medium 30 so that the two code rows on the upstream side reach the position of the reading region size of the reading unit 19, causes the reading unit 19 to perform imaging. The code size determination unit 12c acquires the reading data as the result of reading by performing the imaging twice in this manner from the reading unit 19, and by combining the reading data, acquires the code group reading data for the entire code group as illustrated in FIG. 5A and FIG. 5B.

The code size determination unit 12c analyzes the code group reading data acquired in step S130 (step S140), and determines a code size to be adopted in the second printing processing based on a result of the analysis (step S150). Steps S140 and S150 correspond to a determination step. Specifically, in step S140, the code size determination unit 12c decodes each code included in the code group reading data to read a character string. At this time, when the test character string "ABCDEFGHIJK" can be read from a certain code, it can be determined that the code is read correctly. Therefore, it is sufficient that the code size determination unit 12c sums a correct reading percentage for each code size, and determines a code size according to the correct reading percentage.

FIG. 6 shows an errata 50 as the analysis result in step S140. The code size determination unit 12c generates the errata 50. In the errata 50, for a code for each row number and for each code size, "Good" is marked when the test character string can be successfully read, and "Poor" is marked when reading of the test character string failed. The row number is a number of a code row in the code group, and the row numbers are given here, such as 1, 2, . . . , in order from a most downstream code row to a most upstream code row. According to the example in FIG. 6, for all the four codes with the code size of 1 cm, reading of the test character string failed, and thus the correct reading percentage is 0%. On the other hand, for all the codes with the code size of 4 cm or 5 cm, the test character string is successfully read, and thus the correct reading percentage is 100%.

Basically, reading accuracy of information increases as a size of a code increases. On the other hand, when a large code is printed, consumption of ink may increase, or design properties of a printed material may be impaired. Then, various factors that affect print quality of a code, such as presence or absence of unevenness of a surface, a degree thereof, or ease of ink bleeding, depend on a type of the medium 30. Therefore, a code size for maintaining quality of a code, that is, a minimum required code size for correct reading depends on a type of the medium 30. According to the example in FIG. 6, the correct reading percentage is 100% for the code size of 4 cm or more, thus in step S150, the code size determination unit 12c determines the code size to be adopted in the second printing processing to 4 cm.

However, it is not necessarily to stick to the correct reading percentage of 100%. The code size determination unit 12c may determine, among the plurality of code sizes, as a result of the analysis, a code size for which a correct reading percentage is equal to or greater than a predetermined percentage, for example, a code size for which a correct reading percentage is equal to or greater than 70%, to a code size to be adopted for the second printing processing. In addition, a correct reading percentage as a threshold for determining a code size in step S150 may be set according to a user's designation.

In step S160, the code size determination unit 12c associates the code size determined in step S150 with the type of the medium 30, that is, the type of the use medium when the step S120 is performed, and saves the code size in the storage unit 15, and then ends the flowchart in FIG. 3. It can be said that the code size is associated with the type of the first medium and saved. Since such code size determination processing is automatically performed at various types of timing as described above, an optimum code size for the use medium at each time, that is, for various types of medium 30, is determined and stored. Also, a code size determined and saved by the code size determination processing when the medium 30 of a certain type is used as a use medium is updated by the subsequent code size determination processing newly performed using, as the use medium, the medium 30 of the same type.

The description for step S100 will be supplemented.

The size of the medium 30 may be smaller than the reading region size of the reading unit 19. According to the test code generation condition information 40 in FIG. 4, the reading region size is vertical 20 cm by horizontal 50 cm, but for example, when a medium width of a use medium is 40 cm, in generation of the code group image data, the five code region sizes of 10 cm by 10 cm cannot be arranged horizontally, unlike the examples in FIG. 5A and FIG. 5B. The control unit 11 can recognize a size of a use medium by input from a user, or detection by a predetermined sensor, and the like.

In view of such a situation, the test code generation unit 12a may determine the number of codes constituting a code group in the transport direction D1 (vertical) and the width direction D2 (horizontal) in accordance with a medium width of a use medium, and generate code group image data in which a plurality of codes are arranged according to the determination. According to the test code generation condition information 40 in FIG. 4, the number of codes to be printed is 20. In addition, if a medium width of a use medium is 40 cm, the test code generation unit 12a generates code group image data by arranging a total of 20 codes, that is, codes of five different sizes by four, in each of which the test character string "ABCDEFGHIJK" is recorded, in 20 arranged code region sizes such that the number of codes is vertical five by horizontal four.

Figure 7A:
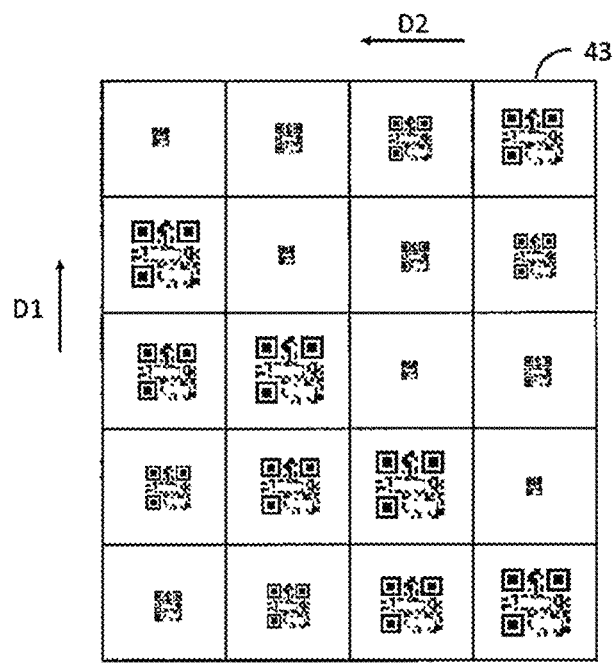
FIG. 7A and FIG. 7B are diagrams each illustrating an example of code group image data.

FIG. 7A illustrates code group image data 43 generated with reference to the test code generation condition information 40 and the medium width of the use medium in step S100. In comparison to the code group image data 41 and 42 in FIGS. 5A and 5B, the code group image data 43 is different in that the four code region sizes are arranged horizontally, and five code region sizes are arranged vertically, but is the same in that the 20 codes are included as a whole. According to the examples thus far, the number of code rows that can be read when the reading unit 19 performs imaging once is two. Thus, when the code group image data 43 is generated in step S100, the control unit 11 causes the reading unit 19 to perform imaging three times to read the code group formed of the five code rows printed on the use medium based on the code group image data 43.

Figure 7B:
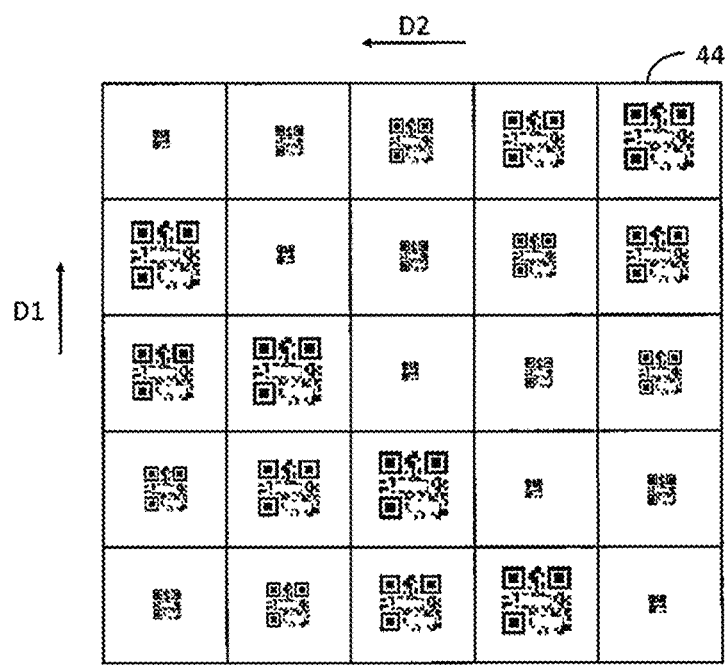

FIG. 7B illustrates an example of code group image data 44 generated with reference to the test code generation condition information 40 in step S100, which is different from those in FIGS. 5A, 5B, and 7A. FIG. 7B is a modification example of FIG. 5B. With respect to FIG. 7B, it is assumed that the number of repetitions in the test code generation condition information 40 is set to "5". Accordingly, the number of codes constituting a code group is a total of 25, that is, codes of five different sizes by five, and in consideration of the reading region size of the reading unit 19, the number of code rows is five. In addition, in the code group image data 44, all the five types of codes having the different sizes are disposed in the five code rows, one code per code row, and the codes with the same size are disposed at different positions, respectively, in the width direction D2. That is, as in FIG. 5B, when the codes of the same size are disposed at different positions respectively in the width direction D2 from the viewpoint of preventing a quality variation due to printing positions, the codes of all sizes may be disposed at all the positions in the width direction D2 within the reading region size, as in FIG. 7B.

3. Production Printing Processing

Next, the second printing processing, that is, the production printing processing will be described.

Figure 8:
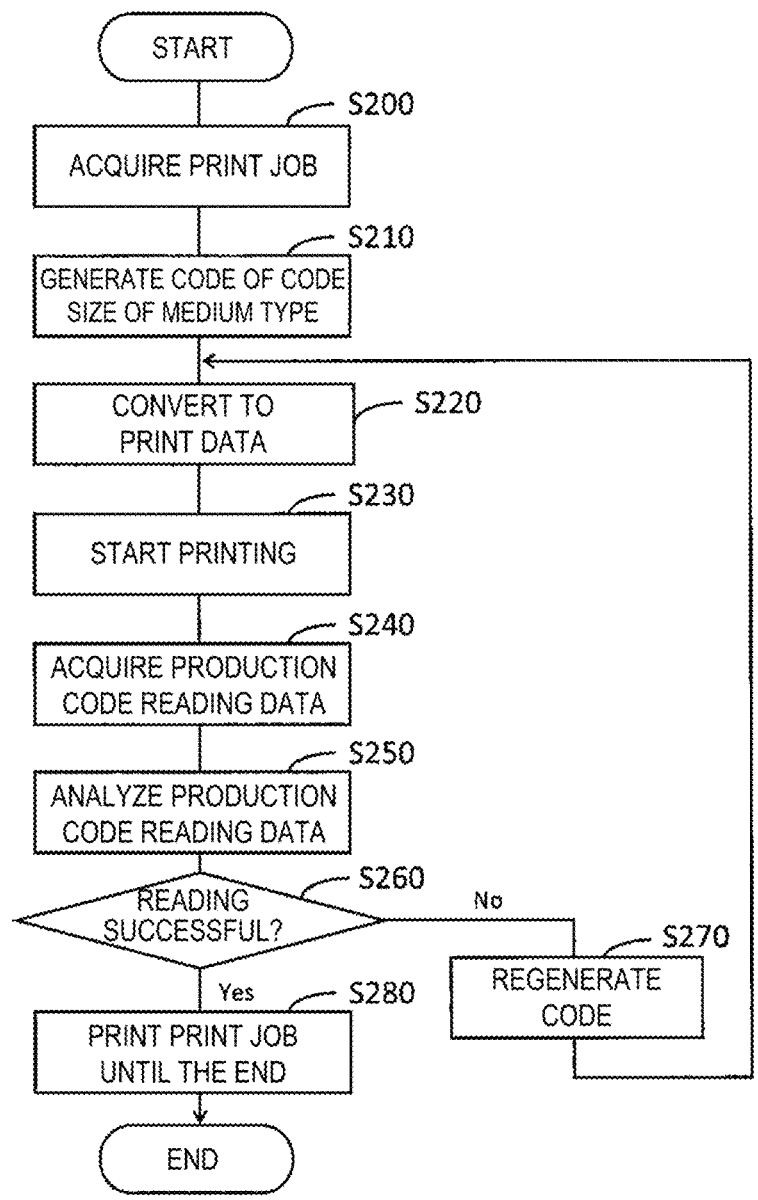
FIG. 8 is a flowchart illustrating production printing processing.

FIG. 8 illustrates, using a flowchart, the production printing processing performed by the control unit 11 in accordance with the program 12.

In step S200, the print job acquisition unit 12d of the control unit 11 acquires a print job. For example, the print job acquisition unit 12d reads out and acquires a print job specified through an operation of the operation receiving unit 14 by a user from a memory inside or outside the printing apparatus 10, or receives and acquires a print job transmitted from an external device via the communication IF 16.

The print job includes an image represented by the print job, that is, image data to be printed, and a print job ID. The image data to be printed is simply referred to as a "target image". The target image is an image that the user wants to obtain as a result of printing. The print job ID is identification information indicating printing conditions of the target image. Examples of the printing conditions include, for example, a print length of the target image in the transport direction D1, a length of the target image in the width direction (image width), a printing mode, and various conditions and settings related to printing of the target image. The print job ID is information with which contents of such printing conditions can be uniquely identified.

In step S210, the printing control unit 12b acquires a code size associated with the type of the use medium and stored in the storage unit 15, and generates a code of this code size. The code generated by the production printing processing corresponds to a "third code". Further, the third code is also referred to as a "production code" in order to distinguish the third code from the above code (test code) constituting the code group. For example, when the code size associated with the type of the use medium and saved in the storage unit 15 is 4 cm, a production code with a size of vertical 4 cm by horizontal 4 cm is to be generated in step S210. Here, the description will be continued assuming that, at the time of step S210, the code size for the type of the use medium is saved in the storage unit 15 by the code size determination processing described above.

The printing control unit 12b generates a production code in which the print job ID included in the print job acquired in step S200, and print date and time are recorded. The print date and time are current date and time. The date and time may be information including even time of day, or may be information with year, month, and day, without time of day. Similar to the code group image data, the production code generated in step S210 is also bitmap data. Of course, the information to be recorded in the production code is not limited to the print job ID and the print date and time, and various types of useful information for a user can be included. In the production code, for example, information about a user who instructs printing of a print job, information such as an organization or a department to which the user belongs, environment information such as humidity and temperature during printing, identification information of the printing apparatus 10 used, and information about a customer planning to purchase a result of printing, and the like.

In step S220, the printing control unit 12b converts image data in which the production code generated in step S210 and the target image included in the print job acquired in step S200 are combined to print data for use in printing by the printing head 20. In step S220, when the printing control unit 12b generates the image data in which the production code and the target image are combined, the printing control unit 12b disposes the production code at a position that is downstream the target image and at which the reading unit 19 can perform reading, such that the production code is printed by the printing head 20 earlier than the target image, and then the production code is read by the reading unit 19.

Figure 9:
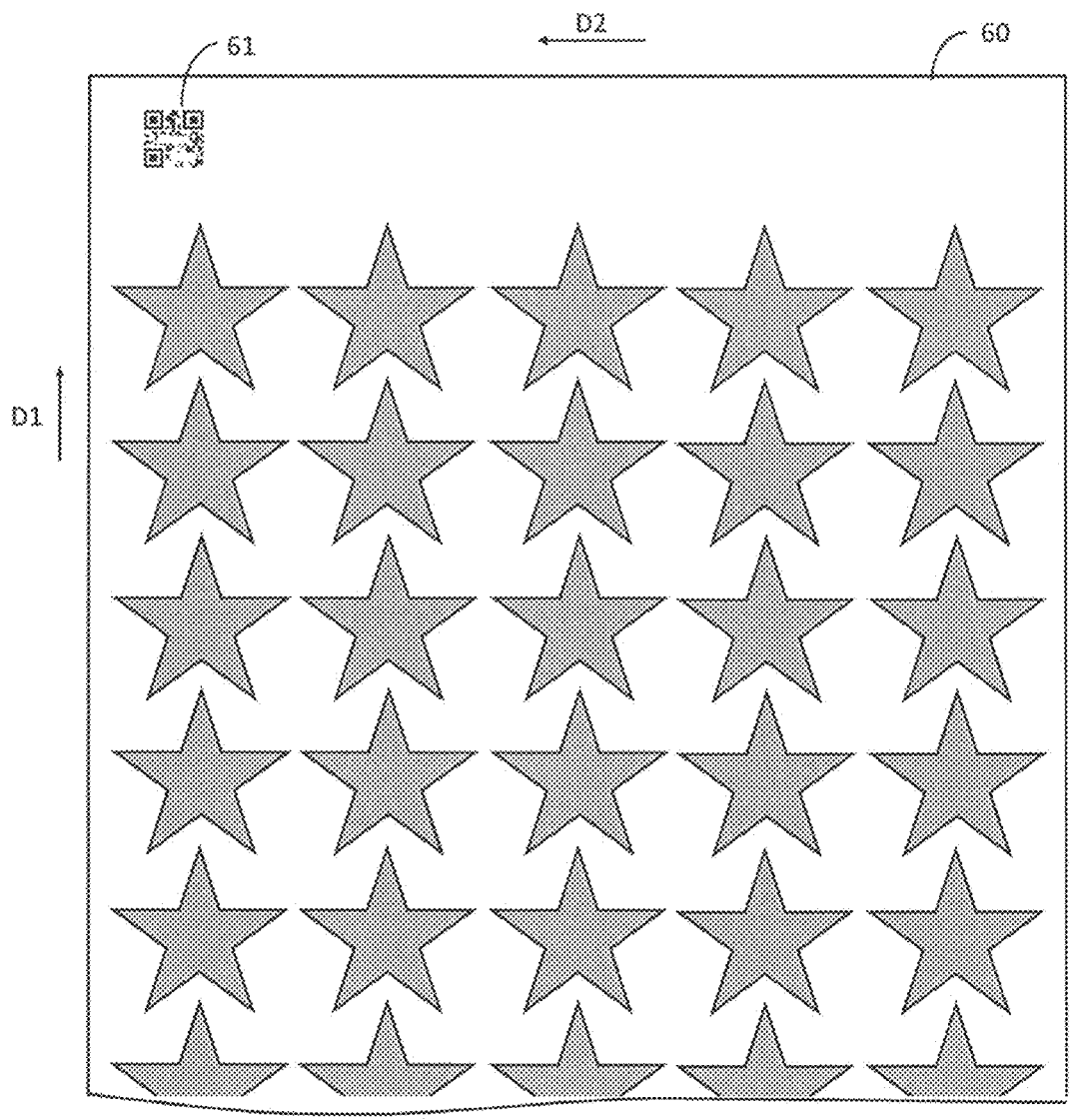
FIG. 9 is a diagram illustrating an example of print data including a production code and a target image.

FIG. 9 illustrates print data 60 obtained by the conversion in step S220. The print data 60 may be understood as image data obtained by combining production code and target image. A production code 61 is disposed at a predetermined position on a downstream side in the print data 60. In addition, an image in which star-shaped patterns are continuous in the print data 60 is an example of the target image.

In step S230, the printing control unit 12b controls the transport unit 17 and the printing unit 18 based on the print data obtained by the conversion in step S220, and starts the production printing for causing the production code and the target image to be printed on the medium 30 by ink discharge from the printing head 20. In this manner, in can be said that the second printing processing is processing for printing the third code of the code size determined for the type of the first medium onto a medium of the same type as that of the first medium. Further, the second printing processing is also processing for printing the third code and the target image.

In step S240, the success/failure determination unit 12e acquires reading data (hereinafter, production code reading data), which is a result of reading, by the reading unit 19, of the production code printed on the medium 30 in step S230. As can be seen from the description in step S220, the production code is printed earlier than the target image onto the medium 30. Accordingly, after the start of printing in step S230, when ink discharge by the printing head 20 and transport of the medium 30 by the transport unit 17 are alternately repeated, for example, and printing of the target image continues, the production code printed on the medium 30 reaches the position of the reading unit 19. Thus, the control unit 11 causes the reading unit 19 to perform imaging of the production code, and the success/failure determination unit 12e acquires production code reading data as a result of reading by the imaging, from the reading unit 19.

The success/failure determination unit 12e analyzes the production code reading data acquired in step S240 (step S250), and determines whether the reading of the production code is successful or not based on a result of the analysis (step S260). As described above, in step S210, the printing control unit 12b generates the production code in which the print job ID and the print date and time are recorded. Accordingly, the print job ID and the print date and time recorded in the production code, which are correct information, are known to the success/failure determination unit 12e from the result in step S210. Thus, in step S250, the success/failure determination unit 12e determines whether a character string obtained by decoding and reading the code included in the code reading data matches the information such as the print job ID and the print date and time recorded in the production code or not, and when the both match, determines that the reading of the production code is successful ("Yes" in step S260), and advances the processing to step S280. On the other hand, when a character string that matches the information such as the print job ID and the print date and time recorded in the production code cannot be read out from the production code reading data, the success/failure determination unit 12e determines that the reading of the production code is unsuccessful ("No" in step S260), and advances the processing to step S270.

In step S280, the printing control unit 12b prints the print job until the end, that is, prints the target image until the end, and ends the flowchart in FIG. 8.

On the other hand, in step S270, the printing control unit 12b changes the code size of the production code to a size larger than the current size, to regenerate the production code. The information itself to be recorded in the production code is not changed from that in step S210. The change to the large size is, for example, when a plurality of code sizes are defined with a step of 1 cm in the test code generation condition information 40, a process for expanding to a larger size by 1 cm vertically and horizontally than the current size. Alternatively, regardless of the definition of the code size in the test code generation condition information 40, the size of the production code may be changed to a larger size, by multiplying the code size of the current production code by a certain constant larger than 1, for example, 1.1.

The printing control unit 12b performs step S270, then step S220. In step S220 after the step S270, it is sufficient that the printing control unit 12b converts image data in which the production code after the size change in step S270 and the target image are combined to print data, and performs step S230 and later. In other words, the second printing processing is performed again after step S270. Since the code size adopted for generating the production code in step S210 is a size determined by the code size determination processing appropriate for the type of the use medium, it is originally unlikely that "No" is determined in step S260. However, even if "No" is determined in step S260, it is possible to output a printing result of the target image including the production code of a size that can be reliably read, by ensuring a cycle for returning to step S220 via step S270.

The printing result according to the flowchart in FIG. 8 is optionally utilized by a user or customer after being collected, but the production code is attached to the printing result. Accordingly, the user or customer can read the production code attached to the printing result with a code reader or the like as appropriate, to check the printing conditions from the print job ID, or to check various types of information such as the print data and time, thus the production code can be utilized for business or operation of the user or customer.

Additionally, in the flowchart in FIG. 8, after starting the printing based on the print data in step S230, and until "Yes" is determined in step S260, the printing control unit 12b may determine to print the production code on the medium 30 and not to print the target image. That is, after the printing of the production code, and steps S240 and 5250 are performed, and then "Yes" is determined in step S260, printing of the target image based on the print data is started. As a result, it is possible to avoid a situation in which "No" is determined in step S260 at a stage where the printing of the target image is advanced to some extent, and the medium 30 and ink required for printing the target image until then are wasted. As described above, when the printing of the target image is started after "Yes" is determined in step S260, the printing control unit 12b may control the transport unit 17 to back-feed the medium 30, and start the printing of the target image by the printing head 20 from a position near a position of the production code in the medium 30. This makes it possible to further suppress consumption of the medium 30. The back-feeding is processing in which medium 30 is transported from downstream to upstream.

4. Summary

As described above, according to the present exemplary embodiment, the printing apparatus 10 includes the transport unit 17 that transports the medium 30 along the predetermined transport direction D1, the printing unit 18 that performs printing on the medium 30 transported by the transport unit 17, the reading unit 19 that reads the medium 30 on which printing by the printing unit 18 is performed, and the control unit 11 that controls the transport unit 17 and the printing unit 18 to perform the first printing processing and the second printing processing. Then, in the first printing processing, the control unit 11 prints a code group including a first code of a first size and a second code of a second size larger than the first size on a first medium that is the medium 30, acquires reading data, which is a result of reading, by the reading unit 19, of the code group printed on the first medium, determines a code size to be adopted for second printing processing based on the reading data, and in the second printing processing, prints a third code of the code size on the medium 30 of the same type as that of the first medium.

According to the configuration, the printing apparatus 10 prints the code group including the codes of the plurality of sizes on the first medium, determines the code size based on the reading data of the code group, and prints the third code of the determined code size on the medium 30 of the same type as that of the first medium. That is, in a situation in which the medium 30 of a certain type is set in the transport unit 17, a code size determined based on a code group printed on the medium 30 of that type is subsequently adopted when a third code is printed on the medium 30 of that type. Accordingly, an appropriate code size is automatically determined for each type of the medium 30, and a third code of a code size according to that type is printed on the medium 30 of a certain type. Accordingly, as compared to the past where a user did trial and error when printing a code on a medium for which information for printing a code having appropriate quality does not exist, it is possible to reduce a burden of the user, and provide a printing method of a code having stable quality, that is, a code that can be appropriately read.

Further, according to the present exemplary embodiment, the control unit 11, in the first printing processing, may print a code group including a plurality of a plurality of codes having a plurality of sizes including the first code and the second code.

According to the configuration described above, for the codes of the plurality of sizes constituting the code group, each size is printed a plurality of times. Thus, the control unit 11 can make a determination more precisely, when determining which size is an appropriate code size based on reading data of the code group.

Further, according to the present exemplary embodiment, in the first printing processing, the control unit 11 may determine the number of codes constituting a code group in the transport direction D1 and the width direction D2 intersecting the transport direction D1, in accordance with an area that the reading unit 19 can read, and print the code group in which a plurality of codes are arrayed according to the determination.

According to the configuration described above, since the number of vertical and horizontal codes constituting the code group is determined in accordance with the area that the reading unit 19 can read, it is possible for the reading unit 19 to read the code group efficiently.

Further, according to the present exemplary embodiment, in the first printing processing, the control unit 11 may determine the number of codes constituting a code group in the transport direction D1 and the width direction D2 intersecting the transport direction D1, in accordance with a length of a first medium in the width direction D2, and print the code group in which a plurality of codes are arrayed according to the determination.

According to the configuration described above, the code group can be reliably printed on the first medium by determining the number of vertical and horizontal codes constituting the code group in accordance with the medium width.

For example, when a medium width of the first medium is longer than a length of the reading region size of the reading unit 19 in the width direction D2, the control unit 11 may determine the number of vertical and horizontal codes constituting the code group in accordance with the reading region size of the reading unit 19, and when the medium width of the first medium is shorter than the length of the reading region size of the reading unit 19 in the width direction D2, the control unit 11 may determine the number of vertical and horizontal codes constituting the code group in accordance with the medium width of the first medium.

In addition, according to the present exemplary embodiment, the second printing processing is processing for printing a third code and an image represented by a print job, and the control unit 11 may print the third code in which identification information indicating printing conditions for the image is recorded in the second printing processing.

According to the above configuration, when a target image represented by a print job is printed on the medium 30 of the same type as that of a first medium, a third code in which identification information indicating printing conditions for the target image is recorded, and for which a size is optimized can be printed together with the target image.

In addition, according to the present exemplary embodiment, the control unit 11 may acquire reading data, which is a result of reading, by the reading unit 19, of a third code printed on the medium 30 by the second printing processing, and determine whether the third code is successfully read or not by analyzing the reading data of the third code, and when it is determined that the reading of the third code is unsuccessful, the control unit 11 may change a code size of the third code to a larger size, and adopt the changed code size to perform the second printing processing again.

According to the configuration described above, in the second printing processing, the third code having a size that can be precisely read can be reliably printed.

Further, according to the present exemplary embodiment, at a predetermined interval, the control unit 11 may repeatedly perform the code size determination processing by the first printing processing, acquisition of reading data of a code group, and determination of a code size based on the reading data of the code group.

According to the configuration, the code size determination processing that is automatic for a user is performed periodically. Thus, an optimal code size for each of various types of the media 30 is updated.

The present exemplary embodiment discloses not only a device or a system, but also a variety of categories of disclosures such as a method performed by a device or a system, or the program 12 that causes a processor to perform a method.

For example, a printing method performed by the printing apparatus 10 including the transport unit 17 that transports the medium 30 along the predetermined transport direction D1, and the printing unit 18 that performs printing on the medium 30 transported by the transport unit 17, includes a first printing step and a second printing step for controlling the transport unit 17 and the printing unit 18, wherein in the first printing step, a code group including a first code of a first size and a second code of a second size larger than the first size is printed on a first medium that is the medium 30, an acquisition step for acquiring reading data that is a result of reading, by the reading unit 19, of the code group printed on the first medium, and a determination step for determining a code size to be adopted in the second printing step based on the reading data are further included, and in the second printing step, a third code of the code size is printed on a medium of the same type as that of the first medium.

5. Modification Examples

Some modified examples included in the present exemplary embodiment will be described. Combinations of the modification examples are also naturally included in the present exemplary embodiment.

First Modified Example

The control unit 11 may cause the reading unit 19 to read a code group printed on a first medium a plurality of times to acquire a plurality of pieces of code group reading data corresponding to reading performed the plurality of times (step S130), and determine a code size based on such a plurality of pieces of code group reading data (step S140, S150). According to the example in FIG. 5A, FIG. 5B, and FIG. 7A, a total of 20 codes in which four codes each having five different sizes are included are printed as a code group as a result of step S120, but the control unit 11 causes the reading unit 19 to read all the codes of such a code group, for example, twice. As a result, the number of times of reading per code size for calculating the correct reading percentage as described above is eight, which is twice four described with FIG. 6, and the correct reading percentage for each code size can be obtained as a more detailed numerical value.

In addition, when the reading unit 19 is caused to read a code group printed on a first medium a plurality of times, the code group may be configured to include each of codes of a plurality of different sizes. For example, the test code generation unit 12a generates code group image data representing a code group formed of a total of five codes including each of codes of five different sizes (step S100), and the printing control unit 12b prints the code group on a use medium based on such code group image data (steps S110, S120).

The control unit 11 may cause the reading unit 19 to read a code group, four times, that is printed on a use medium that is a first medium, and that includes a total of five codes including each of codes of five different sizes, for example, to acquire code group reading data in accordance with the reading performed four times (step S130), and determine a code size based on the code group reading data corresponding to the four times (steps S140, S150). In this way, the number of times of reading per code size for calculating a correct reading percentage is the same as four described with FIG. 6. In other words, by performing printing of each of codes of a plurality of sizes only once, and increasing the number of times of reading, it is possible to calculate a correct reading percentage for each code size, as when each of codes of a plurality of sizes is printed a plurality of times and then read.

Second Modified Example

As described above, the control unit 11 acquires reading data, which is a result of reading, by the reading unit 19, of a third code printed on the medium 30 by the second printing processing, and determines whether the reading of the third code is successful or not by analyzing the reading data of the third code (step S260). Here, when determining that the reading of the third code is unsuccessful, the control unit 11 may perform the first printing processing, the acquisition of reading data of the code group, and the determination of the code size based on the reading data of the code group, again. In other words, when "No" is determined in step S260, the processing does not proceed to step S270, and the code size determination processing in FIG. 3 is performed again. According to such a configuration, it is possible to determine, once again, an optimum code size for a use medium in a current state of the reading unit 19. Note that, when "No" is determined in step S260 in the second modified example or a third modified example described below, the production printing processing in FIG. 8 is aborted.

Third Modified Example

When "No" is determined in step S260, the control unit 11, rather than proceeding to step S270, may notify an outside that the code size determination processing needs to be performed again. In other words, in the second modified example, when the "No" is determined in step S260, the code size determination processing is performed again, but in the third modified example, the notification is performed, to cause the user to determine whether to perform the code size determination processing again or not. It is sufficient that the notification to the outside is realized, for example, by displaying a message or the like by the display unit 13, or by outputting voice by a speaker (not illustrated). For example, the display unit 13 is caused to display a message such as "Please redo the code size determination processing of the two-dimensional code related to the medium in use". A user who recognizes such notification can instruct the printing apparatus 10 to perform the code size determination processing.

Fourth Modified Example

The control unit 11, at a predetermined interval, may notify an outside that the code size determination processing (FIG. 3) by the first printing processing, the acquisition of reading data of a code group, and the determination of a code size based on the reading data of the code group, needs to be performed. That is, instead of automatically performing the code size determination processing, notification that the code size determination processing needs to be performed is performed periodically, and then, each time, a user is caused to determine whether to perform the code size determination processing or not. A user who recognizes such notification can instruct the printing apparatus 10 to perform the code size determination processing.

Other Modified Examples

Of course, all of the specific values used in the above description are all examples, and these numerical values do not narrow the disclosure of the present exemplary embodiment.

In the example in FIG. 2, the position of the reading unit 19 is fixed, but the reading unit 19 may be movable in parallel with the width direction D2, or may be movable in parallel with the transport direction D1. When the reading unit 19 is movable, a reading region size is also determined based on a size of a movable range of the reading unit 19.

The medium 30 transported by the transport unit 17 is not limited to the roll-shaped long medium as illustrated in FIG. 2, and may be a medium such as a cut sheet cut in page units.

For the printing unit 18, various printing methods, such as an electro-photographic method, not limited to the ink jet method, can be employed to perform printing on the medium 30, for example.

What is claimed is:

1. A printing apparatus, comprising:
a transport unit configured to transport a medium along a predetermined transport direction;
a printing unit configured to perform printing on the medium transported by the transport unit;
a reading unit configured to read the medium on which printing is performed by the printing unit; and
a control unit configured to control the transport unit and the printing unit to perform first printing processing and second printing processing, wherein
the control unit
prints, in the first printing processing, a code group including a first code of a first size and a second code of a second size larger than the first size on a first medium that is the medium,
acquires reading data that is a result of reading, by the reading unit, of the code group printed on the first medium,
determines a code size to be adopted for the second printing processing based on the reading data, and
in the second printing processing, prints a third code of the code size on a medium of the same type as that of the first medium.

2. The printing apparatus according to claim 1, wherein the control unit, in the first printing processing, prints the code group including a plurality of each of codes of a plurality of sizes including the first code and the second code.

3. The printing apparatus according to claim 1, wherein the control unit,
in the first printing processing, determines the number of codes constituting the code group in the transport direction and a width direction intersecting the transport direction, in accordance with an area that is readable by the reading unit, and
prints the code group in which a plurality of codes are arrayed according to the determination.

4. The printing apparatus according to claim 1, wherein the control unit,
in the first printing processing, determines the number of codes constituting the code group in the transport direction and a width direction intersecting the transport direction, in accordance with a length of the first medium in the width direction, and prints the code group in which a plurality of codes are arrayed according to the determination.

5. The printing apparatus according to claim 1, wherein the control unit causes the reading unit to read the code group printed on the first medium a plurality of times to acquire a plurality of pieces of the reading data in accordance with the reading performed a plurality of times, and determines the code size based on the plurality of pieces of the reading data.

6. The printing apparatus according to claim 1, wherein the second printing processing is processing for printing the third code and an image represented by a print job, and the control unit, in the second printing processing, prints the third code in which identification information indicating a printing condition for the image is recorded.

7. The printing apparatus according to claim 1, wherein the control unit acquires reading data that is a result of reading, by the reading unit, of the third code printed on a medium by the second printing processing, and determines whether the third code is successfully read or not by analyzing the reading data of the third code, and when it is determined that reading of the third code is unsuccessful, changes a code size of the third code to a larger size, and adopts the changed code size to perform the second printing processing again.

8. The printing apparatus according to claim 1, wherein the control unit acquires reading data that is a result of reading, by the reading unit, of the third code printed on a medium by the second printing processing, and determines whether the third code is successfully read or not by analyzing the reading data of the third code, and when it is determined that reading of the third code is unsuccessful, performs, again, the first printing processing, acquisition of reading data of the code group, and determination of the code size based on the reading data of the code group.

9. The printing apparatus according to claim 1, wherein the control unit acquires reading data that is a result of reading, by the reading unit, of the third code printed on a medium by the second printing processing, and determines whether the third code is successfully read or not by analyzing the reading data of the third code, and when it is determined that reading of the third code is unsuccessful, notifies an outside that the first printing processing, acquisition of reading data of the code group, and determination of the code size based on the reading data of the code group are to be performed again.

10. The printing apparatus according to claim 1, wherein the control unit, at a predetermined interval, repeatedly performs code size determination processing by the first printing processing, acquisition of reading data of the code group, and determination of the code size based on the reading data of the code group.

11. The printing apparatus according to claim 1, wherein the control unit, at a predetermined interval, notifies an outside that code size determination processing is to be performed by the first printing processing, acquisition of reading data of the code group, and determination of the code size based on the reading data of the code group.

12. A printing method performed by a printing apparatus including a transport unit that transports a medium along a predetermined transport direction, and a printing unit that performs printing on the medium transported by the transport unit, the printing method comprising:

a first printing step and a second printing step for controlling the transport unit and the printing unit, wherein in the first printing step, a code group including a first code of a first size and a second code of a second size larger than the first size is printed on a first medium that is the medium, an acquisition step for acquiring reading data that is a result of reading, by a reading unit, of the code group printed on the first medium, and a determination step for determining a code size to be adopted for the second printing step based on the reading data are further included, and in the second printing step, a third code of the code size is printed on a medium of the same type as that of the first medium.

* * * * *